(Model.)

M. T. HAYES.
Collar and Hame Fastener.

No. 227,431. Patented May 11, 1880.

Witnesses:
W. W. Mortimer.
Will H. Kern.

Inventor:
M. T. Hayes
per
F. A. Lehmann, atty.

UNITED STATES PATENT OFFICE.

MILES T. HAYES, OF BURLINGTON, WISCONSIN.

COLLAR AND HAME FASTENER.

SPECIFICATION forming part of Letters Patent No. 227,431, dated May 11, 1880.

Application filed March 4, 1880. (Model.)

*To all whom it may concern:*

Be it known that I, MILES T. HAYES, of Burlington, in the county of Racine and State of Wisconsin, have invented certain new and useful Improvements in Fastenings for Horse Collars and Hames; and I do hereby declare the following to be a full, clear, and exact description of the invention, such as will enable others skilled in the art to which it pertains to make and use it, reference being had to the accompanying drawings, which form part of this specification.

My invention relates to an improvement in fastenings for horse collars and hames; and it consists in two metallic sockets, which receive the lower ends of the collar, one of which sockets is provided with a slotted tongue or projection, which passes through a corresponding opening in the other part, and through which tongue or projection is passed the strap which secures the lower end of the hames together.

It also consists in providing one of these metallic sockets with a staple or loop, through which the martingale passes, so that when the collar is opened the martingale will not drop off, as will be more fully described hereinafter.

The object of my invention is to produce a cheap and simple fastening by means of which the ends of the collars can be readily secured together, so as to dispense with all necessity of having to open them at their upper ends and the trouble of having to pass the collar upside down over the horse's head and then turn it round to get it in position upon his neck.

Another great advantage gained by this invention is that the strap which fastens the ends of the hames together also serves as a lock or fastening to keep the ends of the collar closed.

Figure 1:
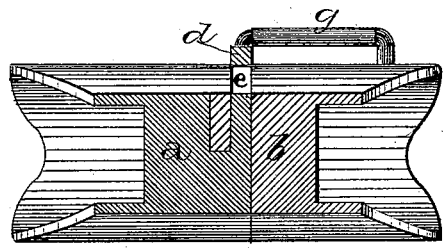
Figure 2:
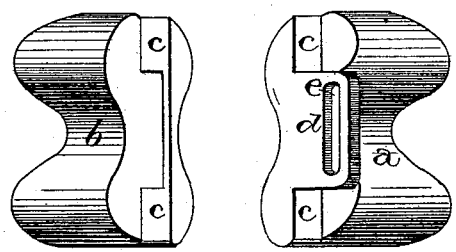

Figure 1 is a vertical longitudinal section of my invention. Fig. 2 is a perspective of the two parts just ready to go together.

$a$ $b$ represent two metallic sockets, in which the lower ends of the collar are securely fastened by means of bolts or any other suitable devices. Each of these sockets is provided with a shoulder or offset, $c$, on its inner end, which shoulders or offsets, when the two sockets come together, serve to prevent the two parts from moving back and forth past each other.

Projecting horizontally outward from the shoulder formed on the part $a$ is the tongue or projection $d$, which passes through a corresponding slot or opening made through the shoulder on the part $b$. The outer end of this tongue or projection has a slot or opening, $e$, made through it, and through which opening passes the strap which fastens the lower end of the hames together. This strap is the only fastening which is necessary to secure the two ends of the collar together, so that when the strap is unbuckled to loosen the hames the collar is opened at its lower end, so as to allow it to be readily lifted from off the horse's neck without the trouble of having to turn it upside down and then pull it over the head.

Secured to the part $b$ is a loop, $g$, through which the martingale passes, which loop serves as a keeper for the martingale, to prevent it from dropping off when the collar is opened. This loop is a very great convenience, as it serves to attach the martingale to the collar in such a manner as to have it always ready for use.

Having thus described my invention, I claim—

1. The combination of the two sockets $a$ $b$, provided with the shoulders $c$, the one $b$ having an opening through its inner end, and the one $a$ a tongue, $d$, to pass through this opening, substantially as shown.

2. A fastening for the lower ends of horse-collars, composed of the two sockets $a$ $b$, and which is provided with a loop, $g$, to hold the martingale, substantially as described.

In testimony that I claim the foregoing I have hereunto set my hand this 23d day of February, 1880.

MILES T. HAYES.

Witnesses:
PERLEE P. ARMOUR,
JNO. REYNOLDS.